March 23, 1948.  C. R. BUCHET  2,438,201
RIVET STEM PULLER AND CUTTER
Filed June 23, 1944  2 Sheets-Sheet 1
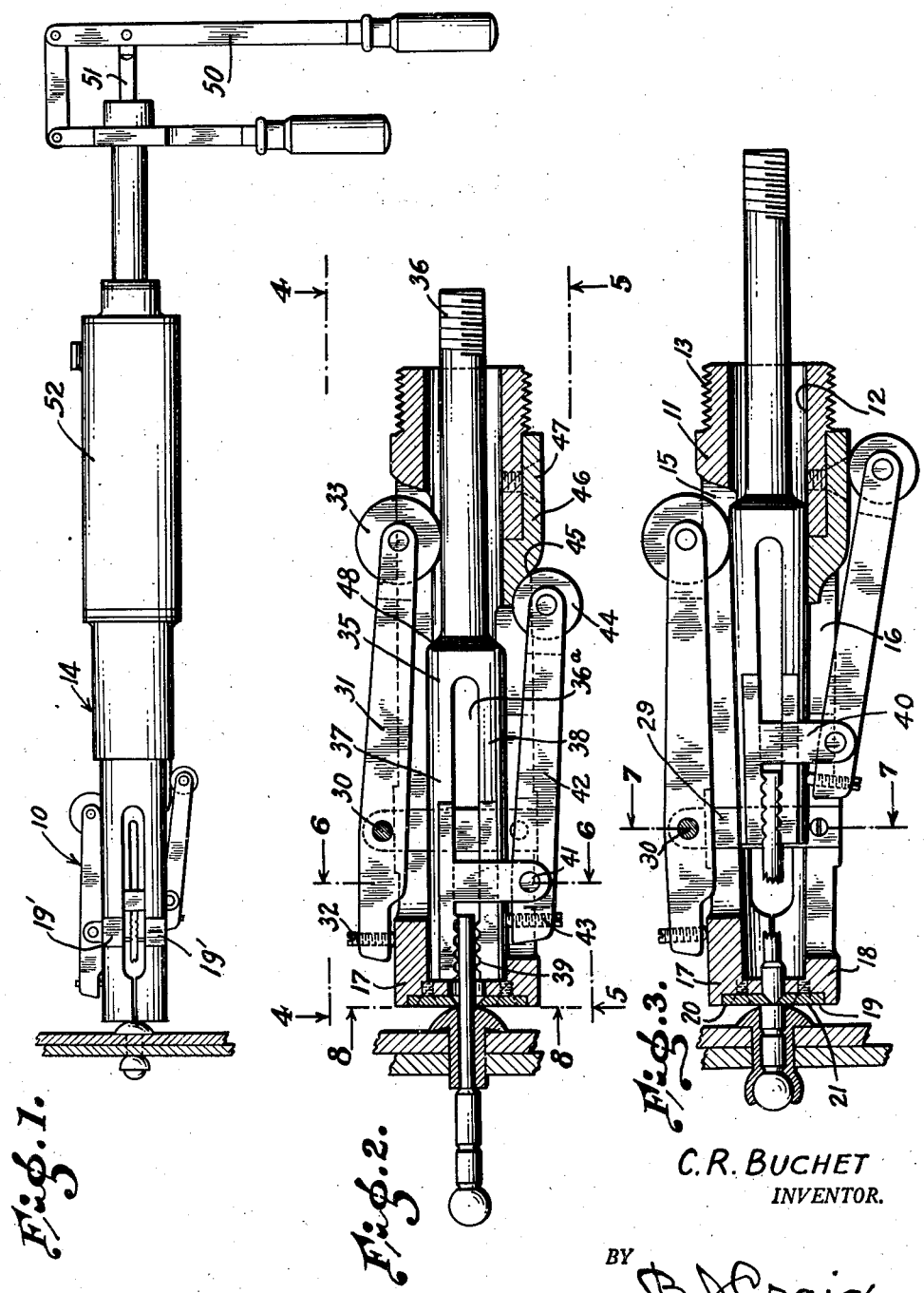
C. R. BUCHET
INVENTOR.
BY B. J. Craig,
ATTORNEY

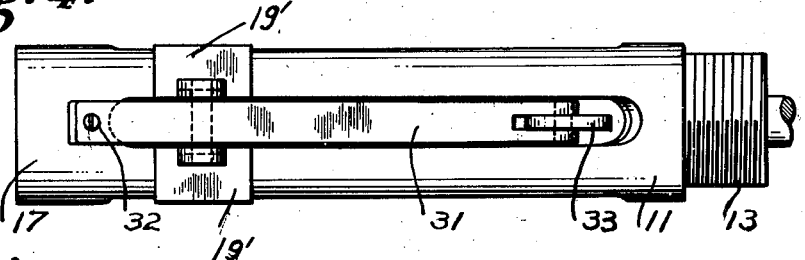
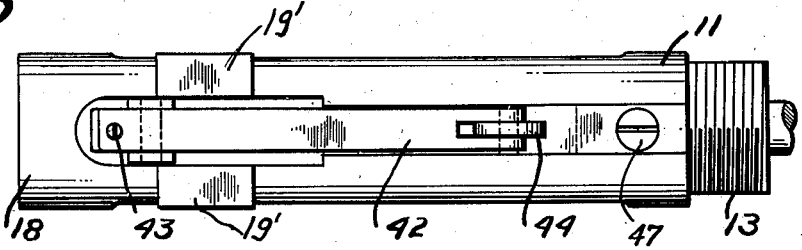
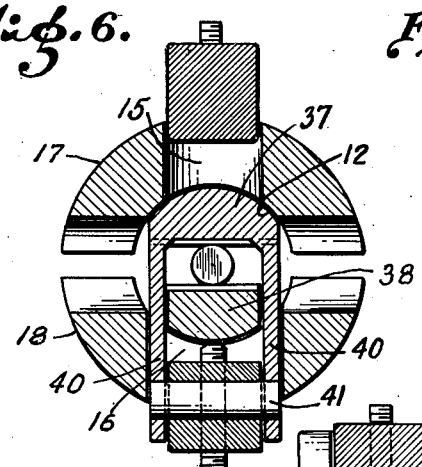
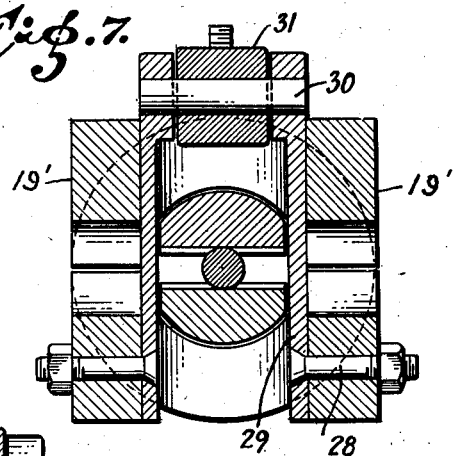
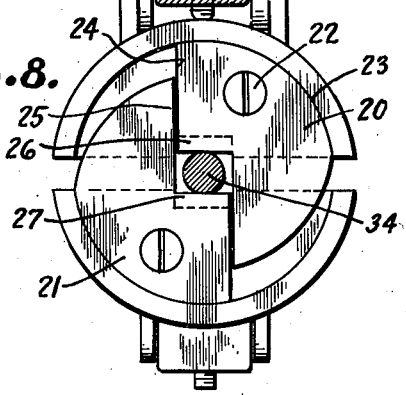

Patented Mar. 23, 1948

2,438,201

UNITED STATES PATENT OFFICE 2,438,201

RIVET STEM PULLER AND CUTTER

Conrad R. Buchet, Pasadena, Calif., assignor of three-fourths to B. F. B. Engineers, Incorporated, a corporation of California, and one-fourth to Milton H. Lees, Jr.

Application June 23, 1944, Serial No. 541,698

8 Claims. (Cl. 218—19)

1

This invention relates to a rivet chuck and cutter.

The general object of the invention is to provide an implement for working a rivet, particularly of the mandrel extrusion type, wherein a shank fits in a tubular headed member and is pulled into place during the fitting of the rivet, and my invention aims to provide compact, efficient, reliable means for performing the necessary functions.

A further object of the invention is to provide a novel cutter particularly adapted to cut off the shank of a rivet.

A further object of the invention is to provide a novel chuck or gripping member for engaging the shank of a rivet.

A further object of the invention is to provide a novel chuck which is designed to engage and pull the shank of a rivet.

An additional object of the invention is to provide a novel combined chuck and cutter adapted to be used in fitting a rivet.

Other objects and advantages of my invention will be apparent from the following description taken in connection with the accompanying drawings, wherein:

Fig. 1 is a side elevation showing a chuck and cutter embodying the features of my invention;

Fig. 2 is a central, longitudinal, enlarged, sectional view showing the jaw and cutter members and operating parts thereof;

Fig. 3 is a view similar to Fig. 2, showing the parts in another position;

Fig. 4 is a top plan view of the chuck and cutter taken on line 4—4, Fig. 2;

Fig. 5 is a bottom plan view of the chuck and cutter taken on line 5—5, Fig. 2;

Fig. 6 is an enlarged section taken on line 6—6, Fig. 2;

Fig. 7 is a section taken on line 7—7, Fig. 3, and

Fig. 8 is an enlarged section taken on line 8—8, Fig. 2.

Referring to the drawing by reference characters, I have shown my invention as embodied in a chuck and cutter which is indicated generally at 10. As shown the apparatus includes a body 11 which has a central bore 12 and has a threaded extremity 13 adapted to threadedly engage a suitable hydraulic operating device 14.

The body 11 is provided with an upper slot 15 and a lower slot 16 and the end of the body remote from the threaded portion 13 is open to provide upper and lower jaws 17 and 18. The jaws 17 and 18 include square portions 19'. During machining of the barrel 11 the portions 19' are

2 left square to receive the nuts on bolts or pivot pins, to be later described. The jaws 17 and 18 are rabbeted as at 19. In the rabbets 19 I arrange opposed upper and lower shear blades 20 and 21 which are held in place as by screws 22. As shown in Fig. 8 the shear blades 20 and 21 have arcuate edges 23 and parallel opposed edges 24 and 25. The blades have sharpened cutting edges 26 and 27 which are adapted to sever the projecting mandrel portion of a mandrel extrusion rivet.

The jaws 17 and 18, due to their construction, are sufficiently resilient so that they may be moved towards and from each other by means which I will now describe. The lower jaw 18 is provided with a pair of support pins 28 which serve as pivots for links 29 which, at their upper end, support a pin 30. The pin 30 in turn supports an arm 31 which, at its forward end, is provided with a bearing and adjusting screw 32. The lower end of the screw 32 engages the outer face of the upper jaw 17.

The end of the arm 31 remote from the bearing member 32 is provided with a roller 33 and the construction is such that whenever the roller and its arm is rocked outwardly the arm will rock about the pin 30 and through the member 32 will force the jaws 17 and 18 toward each other as seen in Fig. 3, so that the shear plates 20 and 21 will move towards each other to shear off the surplus mandrel and end 34 of the rivet.

The rivet shank must first be pulled to properly set the rivet before it is cut off and to accomplish this pulling operation I mount a slide member in the bore 12 of the body 11. The slide member 35 has a threaded extremity 36 adapted to be engaged by the operating device 14 mentioned above. The pull member has a slot 36a therein which forms flexible upper and lower jaws 37 and 38. The jaws 37 and 38, at the end of the slide member remote from the threads 32, have teeth 39 which grip the shank 34 of the rivet for the purpose of pulling the same to its secured position.

In order to cause the jaws 37 and 38 to approach each other to thereby cause the teeth 39 to grip the rivet shank, I show the upper jaw 37 as provided with spaced, downwardly depending links 40 which are disposed one on each side of the lower jaw 38. The links 40 support a pin 41 which pivotally supports an arm 42 which at its forward end has a bearing and adjusting screw 43 which engages the lower jaw 38. The end of the arm 42, remote from the bearing screw 43, has a roller 44 thereon.

The roller 44 engages a cam surface 45 on a plate 46 which is held on the body 11 as by a screw 47 (best shown in Fig. 5). The forward portion of the plate fits within the slot 16, as shown in Fig. 2 and Fig. 3.

From the foregoing description it will be apparent that when the slide member 35 is moved rearwardly the roller 44 will ride up the cam surface 45, thereby rocking the arm 42 and causing the pin 43 to push the lower jaw 38 upwardly. At the same time the arms 40 will be moved downwardly, thus pulling the upper jaw 37 downwardly so that the rivet shank is engaged by the teeth 39. As the pull member 35 moves rearwardly a cam surface 48 thereon engages the roller 33 and rocks the arm 31 from the position shown in Fig. 2 to the position shown in Fig. 3. This action causes the jaws 17 and 18 to move toward each other and causes the shear plates 19 and 20 to sever the rivet shanks. Rollers 33 and 44 are so disposed that the teeth 39 first engage the shank when the pull member starts its movement. Further movement of the pull member causes the shank of the rivet mandrel to be pulled into the hollow portion of the rivet while the shear plates 19 and 20 bear against the rivet head.

At the time the pull member is approaching its extreme movement, the cam 48, by means of the roller 33, rocks the arm 31 and causes the shear plates to sever the shank. Thus it will be seen that the first operation is to pull the rivet shank and the second operation is to cut off the pulled shank but both operations are performed by a single movement of the pull member.

The pull member threaded end 36 may be coupled to an operating member which may be operated by hand, as by a lever system, shown in Fig. 1, with a handle 50 operating a piston 51 in a cylinder 52 and with the body 14 of the operating member engaging the threads 13 on the body previously mentioned.

The pull member illustrated is shown and claimed in my copending application Serial No. 542,391, filed June 27, 1944, now Patent Number 2,395,720, granted February 26, 1946.

Having thus described my invention, I claim:

1. In a rivet working device, a body, a slide member mounted within said body, said slide member including a pair of jaws arranged in opposed relation, a link on one of said jaws, an arm mounted on said link, said arm engaging the other jaw, and means on said body for engaging said arm to rock the arm.

2. In a rivet working device, a body, a slide member mounted within said body, said slide member including a plurality of jaws, a link on one of said jaws, an arm mounted on said link, one end of said arm engaging another jaw, and means to move the other end of said arm.

3. In a rivet working device, a body, a slide member mounted within said body, said slide member including a pair of jaws arranged in opposed relation, a link on one of said jaws, an arm mounted on said link, one end of said arm engaging the other jaw and a cam surface on said body engaging the other end of said arm for rocking the latter.

4. In a rivet working device, a body, a slide member mounted in said body, said slide member including a pair of spring jaws, gripping prongs arranged in opposed relation on said jaws, a link on one of said jaws, an arm mounted on said link, one end of said arm having adjustable means thereon engaging the other spring jaw, the other end of said arm having a roller thereon, and a cam surface on said body engageable by said roller.

5. In a rivet working device, a body, said body having a pair of movable jaws, opposed shear blades carried by said jaws, a slide member mounted in said body, adjustable means carried by one jaw and including a portion engaging the other jaw and operable to move said blades towards each other, and means on the slide member actuating the blade moving means.

6. In a rivet working device, a body having a movable jaw, said body and jaw having opposed shear blades, a link on said body, an arm pivoted on said link, said link being disposed intermediate the length of said body, means on said arm to engage said jaw, a slide member mounted within said body, said slide member having a cam surface thereon adapted to rock said arm and thereby move said blades towards each other, said slide member including a pair of gripping jaws, a link on one of said slide member jaws, an arm mounted on said last mentioned link, one end of said slide member arm engaging the other slide member jaw, and means to rock the other end of said slide member arm to thereby move said gripping jaws towards each other.

7. In a rivet working device, a body, said body having a longitudinally extending, open-ended slot therein defining spring jaws, opposed shear blades carried by said jaws, a link on one of said jaws, an arm pivoted on said link, said link being disposed intermediate the length of said body, one end of said arm being disposed to engage the other of said jaws, the other end of said arm having a roller thereon, a slide member mounted within said body, said slide member having a cam surface thereon adapted to engage said roller to rock said arm and thereby move said blades towards each other, said slide member including a pair of spring jaws, gripping prongs arranged in opposed relation on said slide member jaws, a link on one of said slide member jaws, a slide member arm pivotally mounted on said last mentioned link, one end of said slide member arm engaging the other slide member jaw, the other end of said slide member arm having a roller thereon, and a cam surface on said body engageable by said roller and adapted to shift said slide member arm to move said slide member jaws towards each other, said last mentioned cam surface being disposed to engage its associated roller prior to the time the first mentioned roller is engaged by its cam surface.

8. In a rivet working device, a body, said body having a pair of movable jaws, opposed shear blades carried by said jaws, a link on one of said jaws, an arm pivoted on said link, said link being disposed intermediate the length of said body, one end of said arm being disposed to engage the other of said jaws, a slide member mounted within said body, said slide member having a cam surface thereon adapted to rock said arm and thereby move said blades towards each other, said slide member including a pair of movable spring jaws, gripping prongs arranged in opposed relation on said slide member jaws, a link on one of said slide member jaws, a slide member arm pivotally mounted on said last mentioned link, one end of said slide member arm engaging the other slide member jaw, the other end of said slide member arm having a roller thereon, a cam surface on the body engageable by the roller and adapted to rock said slide member arm to cause said last mentioned jaws to move towards each other, said roller being disposed to rock its associated arm prior to the time the first mentioned cam surface rocks its associated arm.

CONRAD R. BUCHET.

REFERENCES CITED

The following references are of record in the file of this patent:

UNITED STATES PATENTS

| Number | Name | Date |
|---|---|---|
| 52,714 | Hickok | Feb. 20, 1866 |
| 511,885 | Fraley | Jan. 2, 1894 |
| 847,980 | Bowler | Mar. 19, 1907 |
| 1,766,035 | Nielsen | June 24, 1930 |
| 1,829,696 | Wylie et al. | Oct. 27, 1931 |
| 2,049,822 | Polly | Aug. 4, 1936 |
| 2,132,112 | Huck | Oct. 4, 1938 |
| 2,216,767 | Davitow | Oct. 8, 1940 |

FOREIGN PATENTS

| Number | Country | Date |
|---|---|---|
| 371,817 | Italy | Aug. 5, 1939 |